(12) United States Patent
DeVito et al.

(10) Patent No.: US 11,836,413 B2
(45) Date of Patent: *Dec. 5, 2023

(54) CARD PRODUCTS UTILIZING VIDEO SCREEN DISPLAYS

(71) Applicant: Quizzit, Inc., Southold, NY (US)

(72) Inventors: Daniel A. DeVito, Southold, NY (US); Michael Kubisek, Stamford, CT (US)

(73) Assignee: Quizzit, Inc., Southold, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,271

(22) Filed: Dec. 5, 2022

(65) Prior Publication Data

US 2023/0205479 A1 Jun. 29, 2023

Related U.S. Application Data

(63) Continuation of application No. 17/474,741, filed on Sep. 14, 2021, now Pat. No. 11,520,558, which is a continuation of application No. 16/389,626, filed on Apr. 19, 2019, now Pat. No. 11,126,393.

(60) Provisional application No. 62/660,715, filed on Apr. 20, 2018.

(51) Int. Cl.
*G06F 3/147* (2006.01)
*B42D 15/04* (2006.01)
*B42D 15/02* (2006.01)

(52) U.S. Cl.
CPC ........... *G06F 3/147* (2013.01); *B42D 15/022* (2013.01); *B42D 15/042* (2013.01)

(58) Field of Classification Search
CPC .............................. G06F 3/147; B42D 15/042
USPC .......................................................... 348/739
See application file for complete search history.

(56) References Cited

U.S. PATENT DOCUMENTS

| | | | | |
|---|---|---|---|---|
| 6,917,301 B2* | 7/2005 | Blum | ..................... | A47L 23/266 345/204 |
| 7,195,170 B2* | 3/2007 | Matsumoto | ........... | G06F 1/1626 235/472.01 |
| 8,378,978 B2* | 2/2013 | Lee | ........................ | G06F 1/1601 345/173 |
| 8,525,817 B2* | 9/2013 | Sah | ...................... | G02F 1/13452 345/55 |
| 8,777,099 B2* | 7/2014 | Cohen | ................... | G06F 1/1601 235/472.01 |
| 2003/0132924 A1* | 7/2003 | Hamilton | ............. | G09G 3/3453 345/204 |
| 2005/0189139 A1* | 9/2005 | Stole | ..................... | H01M 50/24 29/846 |
| 2006/0049248 A1* | 3/2006 | Becker | ................. | G06Q 10/087 235/385 |
| 2007/0152045 A1* | 7/2007 | Erickson | ................ | G06Q 30/00 235/487 |
| 2008/0109510 A1* | 5/2008 | Gerlt | ........................ | A61J 7/04 709/201 |

(Continued)

*Primary Examiner* — Allyson N Trail
(74) *Attorney, Agent, or Firm* — KRITZER MCPHEE LLP

(57) ABSTRACT

A thin film video device is mounted onto a card stock and incorporated into a card, such as a greeting card. The thin film video device comprises a thin film video display coupled to a computer chip and a speaker. The thin film video device is powered by a local power source such as a small battery. The thin film video device is activated when the user unfolds the card, at which time an audiovisual message is displayed on the thin film video display and through the speaker.

17 Claims, 4 Drawing Sheets

(56) References Cited

U.S. PATENT DOCUMENTS

| | | | |
|---|---|---|---|
| 2013/0283651 A1* | 10/2013 | Marsh | G09F 1/08 |
| | | | 40/124.03 |
| 2014/0084203 A1* | 3/2014 | Fuji | H01M 4/485 |
| | | | 427/126.3 |
| 2015/0224808 A1* | 8/2015 | Shlonsky | B42D 15/04 |
| | | | 40/124.02 |
| 2016/0114613 A1* | 4/2016 | Bogdanski | B42D 15/022 |
| | | | 40/124.03 |
| 2018/0006306 A1* | 1/2018 | Zhu | H01G 9/0425 |
| 2018/0018704 A1* | 1/2018 | Tunnell | G06Q 30/0269 |
| 2018/0027070 A1* | 1/2018 | Jhanji | H04L 67/1091 |
| | | | 709/217 |
| 2019/0026052 A1* | 1/2019 | Krishnasamy | G06F 3/1254 |
| 2019/0324260 A1* | 10/2019 | Hamilton | G02B 23/04 |

* cited by examiner

CARD PRODUCTS UTILIZING VIDEO SCREEN DISPLAYS

CROSS-REFERENCE TO RELATED APPLICATION

This application is a continuation of application Ser. No. 17/474,741, filed on Sep. 14, 2021, now U.S. Pat. No. 11,520,558, which is a continuation of application Ser. No. 16/389,626, filed on Apr. 19, 2019, now U.S. Pat. No. 11,126,393, which claims the benefit of Provisional Application No. 62/660,715, filed on Apr. 20, 2018, and the foregoing applications are incorporated by reference herein in their entirety.

BACKGROUND

It is known in the art to provide greeting cards that are able to generate sound and/or pop up so-called 3 dimensional images. Typically the sound is generated by a small battery and computer chip that is embedded in the card that will produce sound and have an electrical connection when the card is opened by the recipient. New technology has evolved to the point where it can be used to improve upon the experience of the prior art sound and 3 dimensional popup cards.

Also known in the art is the use of conventional small note pads that are usually provided in a stack of removable, single sheets that also are provided with an adhesive substance along a portion of the backside of each sheet so that they may be written upon and attached to various surfaces and removed thereafter. A common example of these is Post-It notes. The principles described herein utilize thin screen technology that is incorporated into an electronic version of prior art note pads. In a preferred embodiment, the thin screen is incorporated into a module that mimics the physical dimensions of the prior art pads. The module can be provided with any number of attachment mechanisms on the backside so that it may be attached to a particular surface; e.g., the module may have a magnetic attachment means to position it on a refrigerator or other metallic surface, or it could be provided with a commercially available adhesive that is easily removable, such as those provided by The 3M Company, to attach it to other surfaces. The module with the incorporated front side screen is equipped with appropriate and well known microchips to allow the module to communicate over a network via communications standards such as WiFi and Bluetooth. Once connected, the user would use a website and/or mobile application to enter messages to be displayed on the screen, and other variables related to the messages, such as time and date, length, disposable, recurring, or link to other apps, such as an e-calendar. The messages would be saved on the module and the website/app. The reader of the messages at the site of the module could scroll through historic and saved messages through a small GUI on the screen, which is preferably touch screen enabled.

The principles described herein recognize that technology has now evolved to the point where video can now be displayed on screens or film that are thin enough such that they can be used in the manufacture of greeting cards. For example, thin and flexible OLED displays are available from companies such as Sony and LG. Other companies are developing their own versions of such screens using LED technology for certain applications, such as Apple's development of MicroLED technology. Although not yet commercially available, the principles described herein utilize such screen technology in several new products and services.

SUMMARY

In one example, a thin film video display is mounted onto card stock and incorporated into a greeting card and is powered by a small power source such as a conventional dime sized battery and activated when the recipient or other user unfolds the card. The activation mechanism is chosen from mechanisms known in the art, such as mechanisms typically used in prior art cards that produce sound effects.

In some embodiments, the card is supplied with prerecorded video and/or messages appropriate for the intended use of the card. For example, a birthday card could include a prerecorded message of a famous figure singing happy birthday, and a holiday card could include a snowfall or summer ocean scenes. If used in other media, the principles disclosed herein could be utilized for consumer information. For example, the technology can be incorporated into a menu to show highlights or photos or specials. It could be used in a promotional brochure or marketing package, such as those used by agencies and firms looking to attract employees or investors, to show a small video of appropriate promotional material in the brochure. The images that could be recorded and displayed are limitless.

BRIEF DESCRIPTION OF THE DRAWINGS

The detailed description makes reference to the accompanying figures wherein.

The figures are intended to facilitate the description of the principles disclosed herein. The figures do not illustrate every aspect of the principles disclosed herein and do not limit the scope of the principles disclosed herein. Other objects, features, and characteristics will become more apparent upon consideration of the following detailed description.

DETAILED DESCRIPTION

A detailed illustration is disclosed herein. However, techniques, methods, processes, systems and operating structures in accordance with the principles disclosed herein may be embodied in a wide variety of forms and modes, some of which may be quite different from those disclosed herein. Consequently, the specific structural and functional details disclosed herein are merely representative.

None of the terms used herein, including "a," "an," "the," and "their," are meant to limit the application of the principles disclosed herein. The use of "or" is intended to include "and/or," unless the context clearly indicates otherwise. The terms are used to illustrate the principles disclosed herein and are not intended to be limiting.

Figure 1A:
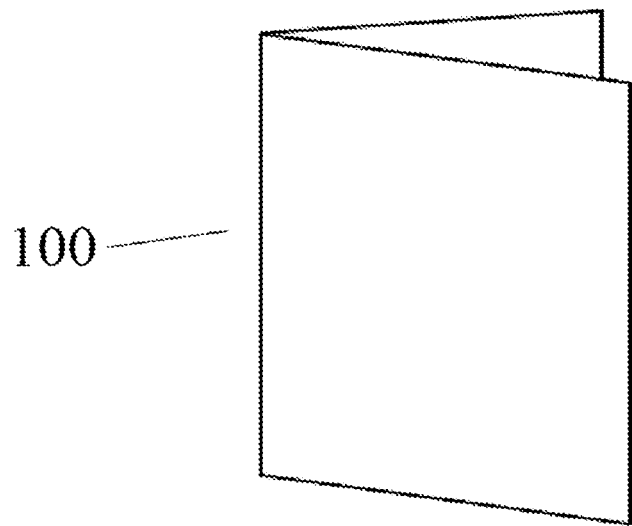
FIG. 1A illustrates an embodiment of a product, namely a greeting card, utilizing a thin film video display in accordance with the principles disclosed herein.
Figure 1B:
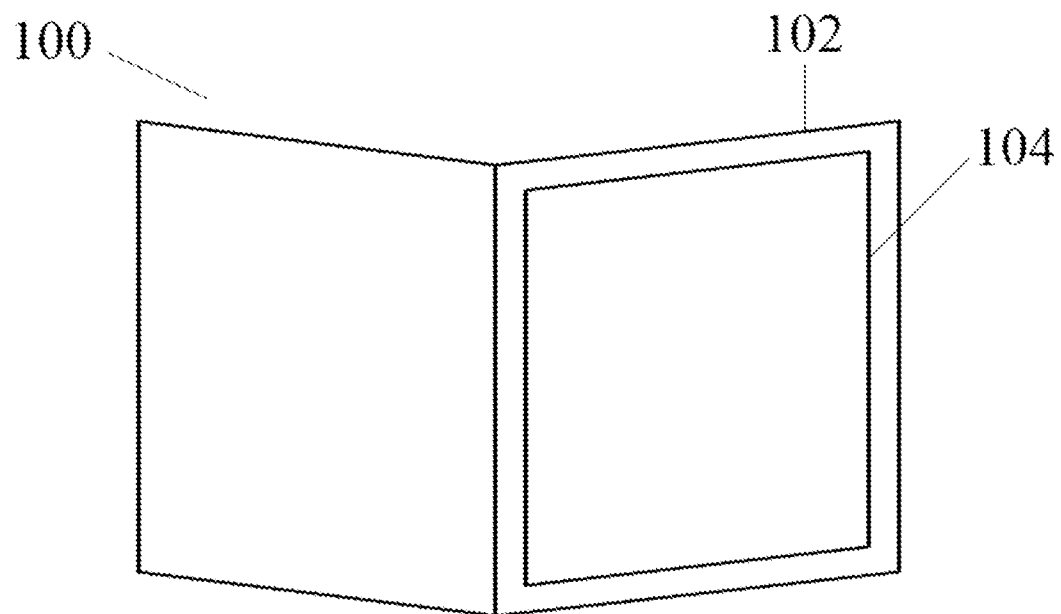
FIG. 1B illustrates the greeting card in an open position.

One embodiment of a product utilizing a thin screen display is depicted in FIGS. 1-4. As shown in FIG. 1, a thin film video display 104 is mounted onto a card stock 102 and incorporated into a card 100, such as a greeting card. The thin film video display 104 is powered by a small power source and is activated when the user unfolds the card 100. In some embodiments, the activation mechanism is a slider switch which is well known in the art and is typically used in prior art cards that produce sound effects. In some embodiments, the activation mechanism is a light-activated sensor which connects the power supply or otherwise triggers the thin film video display when exposed to light. In some embodiments, the activation mechanism is a more traditional switch, button, or other mechanism which may be manually activated by a user. In some embodiments, the card may comprise card stock, other forms of paperboard, or other suitable materials such as a rigid or semi-rigid plastic or metal.

Figure 2:
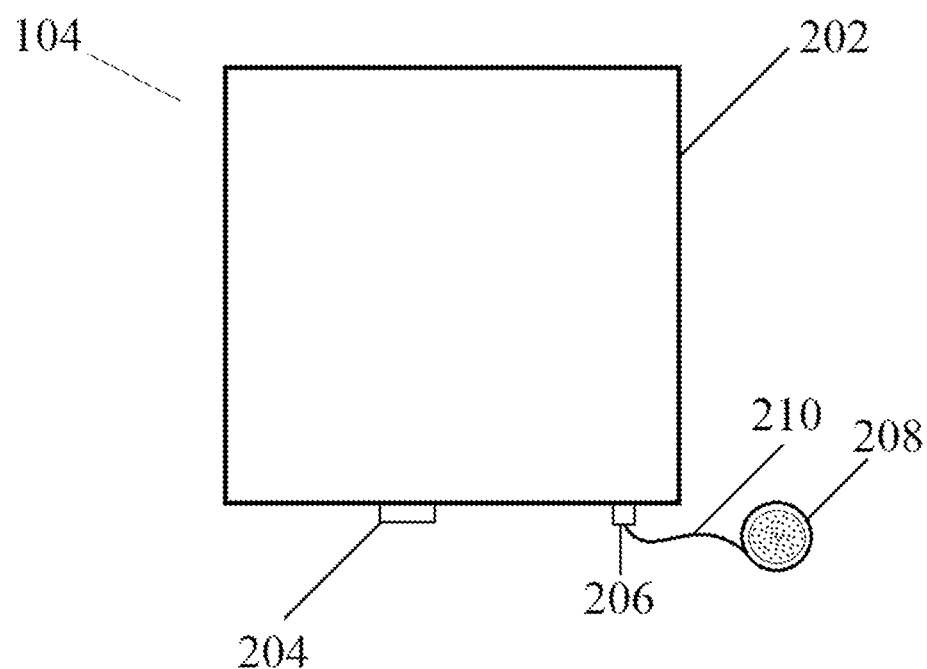
FIG. 2 illustrates the front view of the thin film video display as used with a greeting card.

FIG. 2 shows the thin film video display 104 removed from the card 100. As shown in FIG. 2, the thin film video display 104 is made up of a thin film video screen 202, a screen input 204, and an audio jack 206. A speaker 208 is connected to the audio jack 206 through an audio connector 210. The thin film video display 104 is configured to receive a video input signal through the screen input 204 and display the video on the thin film video screen 202. Audio associated with the video will be played through the speaker 208 connected to the thin film video device 104 through the audio jack 206. In some embodiments, the thin film video display 104 comprises electronic paper, or e-paper, such as the E Ink displays commercialized by Pervasive Displays, Inc. In other embodiments, the thin film video display 104 comprises organic light emitting diode (OLED) technology, such as the rollable transparent active-matrix OLED (AMOLED) panel demonstrated by Samsung Display.

Figure 3:
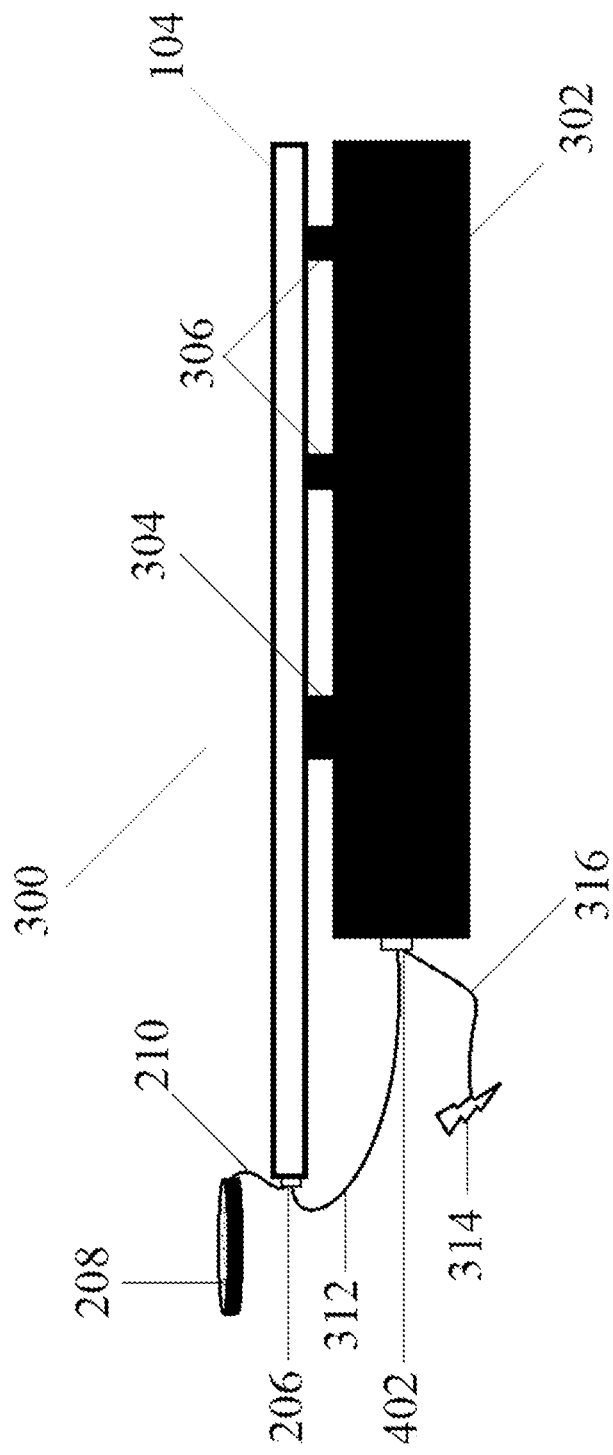
FIG. 3 illustrates the side view of the thin film video display as used with a greeting card.

FIG. 3 illustrates a side view of the thin film video device 300 removed from the card 100. The thin film video device 300 comprises the thin film video display 104, the speaker 208, and a computer chip case 302 housing a computer chip (not shown) and a battery (not shown). As shown in FIG. 3, computer chip case 302 is coupled to the rear side of thin film video device 104 via supports 306 and an enclosed chip-to-display power connector 304. Enclosed in the chip-to-display power connector 304 are connectors which allow power from the computer chip case 302 to be transferred to the thin film video display 104. Use of power connector 304 eliminates the need for the thin film video display 104 to contain its own wire or other connection to a power source. In some embodiments, only power is transferred through the chip-to-display power connector 304. Information, such as the video data, is transferred from the computer chip out of the computer chip case 302 through chip data input/output port 404 (shown in FIG. 4), then to screen input 204 (shown in FIG. 2) of the thin film video display 104 via a chip-to-display data connector 312. In other embodiments, both power and information are transferred from the computer chip case through chip data input/output port 404 to screen input 204 via the chip-to-display data connector 312. The speaker 208 and audio connector 210 are connected to the thin film video display 104 through the audio jack 206. An optional power source 314 and power cable 316 are connected to the battery and/or computer chip inside the computer chip case 302 via the computer chip power input 402. In some embodiments, computer chip case 302 may be replaced by a printed circuit board (PCB) or other suitable board or surface on which the chip, power supply, chip-to-display power connector, and other components are mounted.

This fully connected thin film video device 300 may then be inserted into the card 100 whereby only the thin film video display 104 is showing through the card 100. The computer chip case 302 and speaker 208 are preferably enclosed inside the card 100 so that they are hidden to the user of the card 100, all as shown in FIG. 1.

Figure 4:
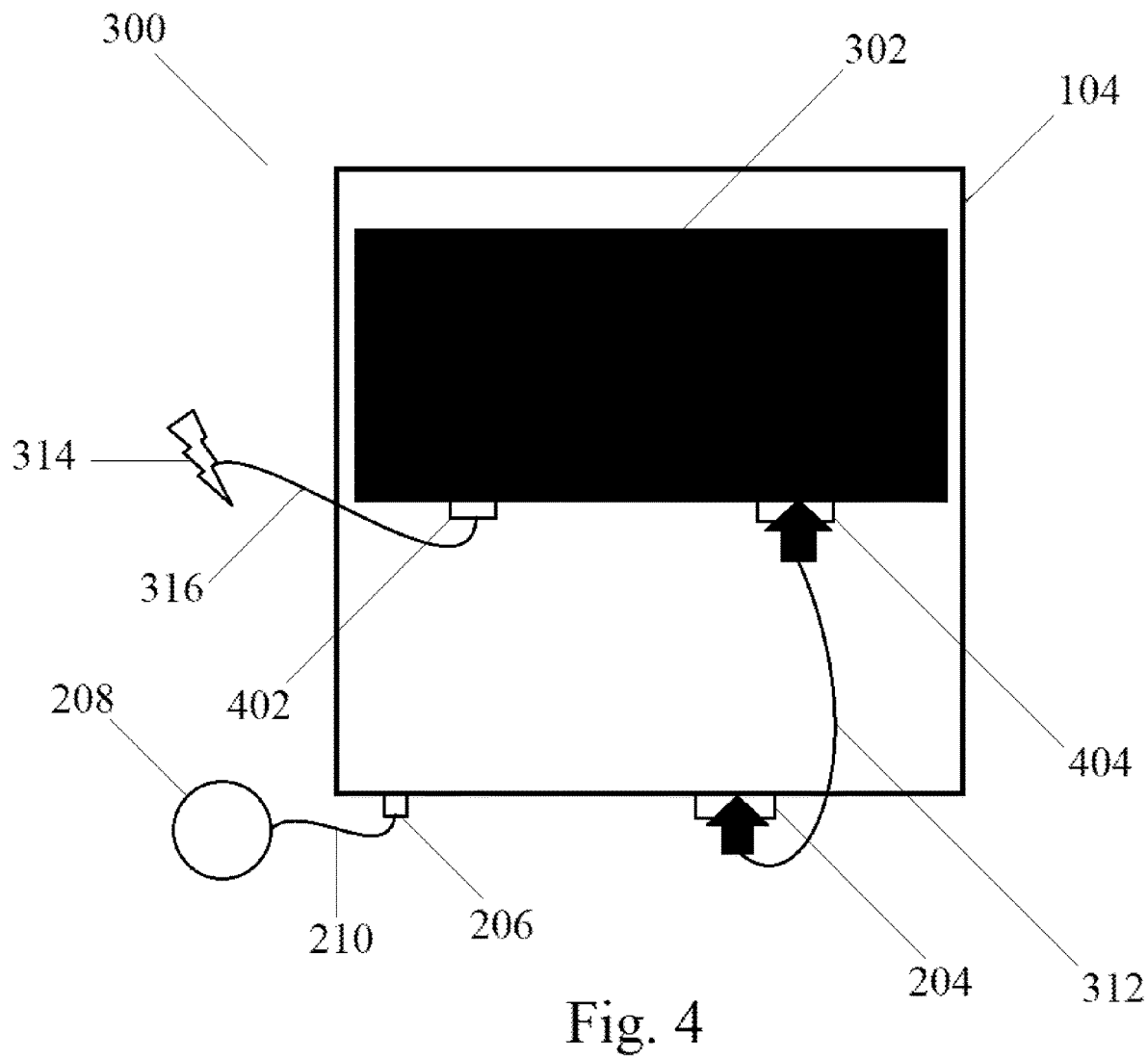
FIG. 4 illustrates the back view of the thin film video display as used with a greeting card.

FIG. 4 shows the rear view of the thin film video device 300 and each of the connections between the thin film video display 104 and the computer chip enclosed in the computer chip case 302. The thin film video device 300 comprises a switch or other suitable activation mechanism (not shown) to activate the thin film video display 104 when the switch or other mechanism is engaged. Activation mechanisms may include, but are not limited to, a slider switch, a magnetic slider switch, light-activated sensor, a plain switch or button, or any other suitable activation mechanism.

In some embodiments, power is supplied from the power source 314, through the power cable 316, and to the battery and/or computer chip inside the computer chip case 302 via the computer chip power input 402. The chip-to-display data connector 312 is plugged into the screen input 204 at one end and the chip data input/output port 404 at the other end. This connection allows the thin film video display 104 to display the information provided by the computer chip inside the computer chip case 302. If the information transferred from the computer chip inside the computer chip case 302 to the thin film video display 104 contains audio, the audio will be played out of the speaker 208 which is plugged into the audio jack 206 through the audio connector 210. In some embodiments, audio connector 210 is connected to chip data input/output port 404, thereby eliminating the need for audio jack 206 and allowing for the audio to be transmitted directly from the computer chip case 302 to speaker 208.

Greeting cards are often cherished by recipients and frequently looked at over time. While handwriting is somewhat permanent, a video screen will only be able to display video for the life cycle of its battery or power source. With further reference to FIG. 4, the battery inside computer chip case 302 is preferably positioned inside a coin cell battery holder and connected to computer chip by a wire, through direct contact, via a printed circuit board (PCB), or other suitable means. In some embodiments, the battery may be recharged by connecting an optional power source 314. The connection may be made via a standard electrical charging cable, such as a mini USB cable or other suitable connector, coupled to a suitable power source. The cable or other connector can be used to recharge an internal battery within the computer chip case. In some embodiments, the card 100 comprises a replaceable battery which may be accessed and replaced via a small slot in the computer chip case. A suitable battery, such as a commercially available coin battery, may be used for this purpose. In other embodiments, a thin-film battery may be utilized without departing from the principles disclosed herein. Further, in some embodiments, a wireless charging technology may be used, such as an induction charger that allows an internal battery to be charged wirelessly when the card is placed on a suitable charging base. The audiovisual message stored in the card is preferably stored in non-volatile memory so that it is not lost when the power source is depleted or disconnected from the device.

The thin film video display 104 can be used to display prerecorded text, images, or video from a known database or from a recorded message. For example, a user may choose a message from a prestored database, such as, for example, video clip sharing service YARN (available at https://getyarn.io), and select a prerecorded message to be downloaded to the card. In some embodiments, the thin film video device comprises a wireless modem coupled to the chip which enables wireless communication (such as Bluetooth and/or WiFi connections) between the card and nearby electronics device such as a mobile phone or computer. In some embodiments, the thin film video device comprises a wired communication port (such as a micro USB port) which enables a wired communication with an electronics device, such as computer or a kiosk at the location where the card is purchased. Instead of, or in addition to, using prerecorded media, a user can enter text and/or take a photograph and/or a video on a mobile phone or other recording device and download the media to the card through the aforementioned means of communication. Software may be required to format the data to meet the requirements of the chip and thin film display. If so, the user may download an application that enables the data to be formatted accordingly. The user may also upload the media to a website to have the data formatted accordingly and then download the formatted data for use on the card. The disclosed application and or website optionally enables the user to modify the media by, for example, adding filters or effects or additional text to the media before downloading it to the card.

In some embodiments, a card is supplied with prerecorded video or messages appropriate for the intended use of the card. For example, a birthday card could include a prerecorded message of a famous figure singing happy birthday, and a holiday card could include a snowfall or summer ocean scenes.

In accordance with the principles disclosed herein, a thin film video display can be used to create an electronic small display akin to a Post-It note. The display case or mechanism can be supplied with a removable tacky substance, such as 3M Commander, so that it can be displayed and/or moved to any location. In some embodiments, the display is be supplied with a magnetic backing that can be fixed to any appropriate surface. The display and micro controller can be accessed through a wireless connection through a website or mobile application so that the user can enter digital information such as messages, photographs, or video and can control the display and or management of the information from the website or application. In some embodiments, the device also has the ability to store messages and display them at a time specified by the user. If a user is away from the location of the device, the user can enter messages to be displayed on the device remotely and can control the time at which the message will be displayed. For example, a user can post a message to take out the garbage every Tuesday at 3:00 PM or take the dogs out at any time specified by the user. In some embodiments, the user can program the device locally, either through a wired or wireless connection, to store predetermined messages and/or schedule such messages to be displayed. The messages can be stored in the device, and the viewer of the device can have the ability to look at stored messages by using an icon or using swipe technology known in the art.

The principles disclosed herein may also be utilized in other media for consumer information. For example, the technology can be incorporated into a restaurant menu to display options for purchase and highlight certain items, list specials, or display photos. It could also be used in a promotional brochure or marketing package, such as those used by agencies and firms looking to attract employees or investors, to show a video of prerecorded promotional or marketing material.

The foregoing detailed description is not intended to be limiting or represent an exhaustive enumeration of the principles disclosed herein. It will be apparent to those of skill in the art that numerous changes may be made in such details without departing from the spirit of the principles disclosed herein.

What is claimed is:

1. An electronic message device, comprising:
    a housing having a front side and a rear side, the front side comprising a transparent surface;
    a video screen visible through the transparent surface;
    a computer chip communicatively coupled to the video screen;
    a wireless modem communicatively coupled to the computer chip;
    a battery electrically coupled to the computer chip and the video screen;
    a switch communicatively coupled to the computer chip, the switch having an on position and an off position;
    wherein the computer chip and the video screen are configured to display a video when the switch is moved to the on position.

2. The electronic message device of claim 1, wherein the rear side comprises an attachment portion for attaching the device to a surface.

3. The electronic message device of claim 1, further comprising:
    a speaker communicatively coupled to the computer chip; and
    wherein the speaker and the computer chip are configured to play an audio message when the switch is moved from the off position to the on position.

4. The electronic message device of claim 3, further comprising:
    a computer chip case housing the computer chip;
    the computer chip case comprising a chip data input/output port;
    the computer chip case comprising an audio jack;
    wherein the speaker is electrically coupled to the chip data input/output port.

5. The electronic message device of claim 1, further comprising a computer chip power input configured to be connected to an external power source.

6. The electronic message device of claim 1, wherein the computer chip case comprises a battery removal slot.

7. The electronic message device of claim 6, further comprising a computer chip power input configured to be connected to an external power source.

8. The electronic message device of claim 7, wherein the computer chip case comprises a battery removal slot.

9. The electronic message device of claim 1, wherein the video screen comprises an e-paper display.

10. The electronic message device of claim 1, wherein the video screen comprises an OLED panel.

11. The electronic message device of claim 1, wherein the battery is removable.

12. The electronic message device of claim 1, wherein the on-off switch is operable to be turned on or off remotely.

13. The electronic message device of claim 1, wherein the switch is a light-activated sensor.

14. The electronic message device of claim 1, wherein the video screen has a depth of 1.0 millimeters.

15. The electronic message device of claim 1, wherein the video screen has a depth of 0.923 millimeters.

16. The electronic message device of claim 2, wherein the attachment portion comprises a magnet or an adhesive material.

17. The electronic message device of claim 1, wherein the housing is configured as a rectangle.

\* \* \* \* \*